United States Patent
Huege et al.

(10) Patent No.: US 7,105,114 B2
(45) Date of Patent: Sep. 12, 2006

(54) BRIQUETTING OF LIME BASED PRODUCTS WITH CARBON BASED ADDITIVES

(75) Inventors: Fred R. Huege, Colleyville, TX (US); Kevin D. Ingram, Fort Worth, TX (US)

(73) Assignee: Chemical Lime Company, Fort Worth, TX (US)

( * ) Notice: Subject to any disclaimer, the term of this patent is extended or adjusted under 35 U.S.C. 154(b) by 20 days.

(21) Appl. No.: 10/915,617

(22) Filed: Aug. 10, 2004

(65) Prior Publication Data
US 2006/0032327 A1   Feb. 16, 2006

(51) Int. Cl.
*B29B 43/02* (2006.01)
(52) U.S. Cl. .................................................. 264/109
(58) Field of Classification Search ......... 264/109–128
See application file for complete search history.

(56) References Cited

U.S. PATENT DOCUMENTS

| 3,941,582 A |   | 3/1976 | Baum ............................. 75/4 |
| 4,659,374 A |   | 4/1987 | Alanko et al. .................. 75/3 |
| 5,186,742 A |   | 2/1993 | Hoffman et al. .............. 75/773 |
| 5,413,746 A | * | 5/1995 | Birjukov ..................... 264/118 |

* cited by examiner

*Primary Examiner*—Mary Lynn Theisen
(74) *Attorney, Agent, or Firm*—Charles D. Gunter, Jr.

(57) ABSTRACT

A method is shown for briquetting quicklime fines. A source of quicklime or dolomitic quicklime fines is combined with a binder in the form of a pseudo-plastic carbon containing material which will deform under briquetting conditions of elevated temperature and pressure and flow and which will also return to a solid phase and bind the quicklime fines upon cooling. An external force is applied to the mixture of fines and binder, as with a briquetting machine, sufficient to form the mixture into a briquette having requisite strength and durability characteristics. Suitable classes of carbon containing materials include Gilsonite®, a solid coal tar pitch and recycled plastics such as polyethylene and polypropylene.

6 Claims, 3 Drawing Sheets

BRIQUETTING OF LIME BASED PRODUCTS WITH CARBON BASED ADDITIVES

BACKGROUND OF THE INVENTION

A. Field of the Invention

The present invention relates generally to a method of improving the strength of briquettes made from lime based products, such as those made from dolomitic quicklime, through the use of a binder having a carbon constituent.

B. Description of the Prior Art

Lime based compounds have many practical uses in a variety of different industries. For instance, these substances are used in the steel industry, e.g., as fluxing agents; in treating waste water and sewage; as soil neutralizing agents and nutrients; in ground stabilization for construction; and as components for building materials.

A number of different chemical species are often lumped together under the generic term "lime." For example, limestone is a mineral which is mined commercially and is used in various industries in crushed or powdered form. "Limestone" generally means $CaCO_3$, while "dolomitic limestone" generally refers to the presence of $MgCO_3$ or to a mixture of $MgCO_2 \cdot CaCO_3$. Powdered limestone is converted to quicklime, by a calcining operation, typically by roasting in rotary kilns. Quicklime may be high calcium, magnesian, or dolomitic and of varying degrees of chemical purity. Quicklime is slaked with water to form hydrated lime.

Thus, calcium oxide (CaO) is generally referred to in the industry as "quicklime", while $Ca(OH)_2$ is referred to as hydrated lime or "hydrate", both types of materials often being referred to generically or informally as "lime". Dolomitic quicklime has the formula $CaO \cdot MgO$. Quicklime is usually provided in the form of lumps or pebbles. Dry hydrated lime is usually a powder. In order to further process these compounds and improve the ease with which they are handled, dry $CaO$, $CaO \cdot MgO$ or $Ca(OH)_2$ can be mixed with water to form a slurry in a slaking operation. During the slaking of quicklime, large amounts of heat are generated which can significantly raise the temperature of the slurry.

Historically, the lime industry has maintained a material balance between lump or pebble quicklime and the fine quicklime generated during calcination and subsequent material handling. In regards to high calcium quicklime, the lime industry has developed markets for the fine quicklime, i.e., particles which are typically less than ¼ inch in size. In some situations, however, an excess of the fine quicklime is produced. As a result, there have been attempts in the industry to lump or agglomerate these fines together in the form of "briquettes". The briquettes so produced not only eliminate excess fines but also increase the amount of pebble quicklime produced by adding the briquetted lime to the supply of traditional pebble lime.

One problem with the briquetted lime produced to date has been that the crush strength of the briquettes was less than that of natural pebble lime. As a result, the thus formed briquettes would suffer breakage and disintegration during material handling and shipping. Over the years, several additives have been utilized to increase the strength and durability of lime briquettes, including calcium stearate and paper fibers. However, for a multitude of reasons, the production of briquettes using existing additives has not been widely accepted commercially. The use of briquetting additives of the type commonly used for other industrial products is limited for the briquetting of quicklime. This is due not only to the fact that quicklime reacts violently with water, but also because of the potential adverse effect the traditional briquetting additives might have on the end use of the briquetted quicklime.

Over the past several years the US steel industry has utilized increasing amounts of pebble dolomitic quicklime, $CaO \cdot MgO$, as a fluxing agent. Unfortunately the fine dolomitic quicklime produced during calcining and material handling cannot be used for conventional high calcium quicklime markets.

A need exists, therefore, for an improved method for briquetting dolomitic quicklime which will produce briquettes of sufficient strength to resist the stresses of material handling in both the initial dolomitic quicklime production and also the ultimate end application processing, e.g., the steel customer's handling and processing equipment.

A need also exists for such a briquetting technology in which an improved binder additive is utilized which binder is not detrimental to the end application of the briquettes and may actually be advantageous in such end applications.

A need specifically exists in the steel industry for an improved binder additive for briquetting lime fines which additive has no detrimental effect on the use of the dolomitic quicklime as a steel fluxing agent and which, in the optimum case, actually adds value as the briquette is used in the steel making process.

SUMMARY OF THE INVENTION

In the present method of briquetting quicklime fines, a source of quicklime or dolomitic quicklime fines is provided, as for example, the waste fines from a lime calcining operation. An improved binder is added to the source of quicklime fines. The binder comprises a pseudo-plastic carbon containing material which will deform under briquetting conditions of elevated temperature and pressure and flow and which will also return to a solid phase and bind the quicklime fines upon cooling. Preferred binders are selected from the group consisting of Gilsonite® solid coal tar pitches, including petroleum enhanced coal tar pitches, and recycled plastics including polyethylene, polypropylene and other commercially produced thermoplastics. An external force is then applied to the mixture of fines and binder sufficient to form the mixture into a briquette having requisite strength and durability characteristics.

In the preferred formulations, the binder is present in an amount ranging from about 0.5 to 5% by weight, based upon the total weight of the mixture. The briquettes so produced are characterized as having a crush strength which is greater than about 250 pounds when the binder is present in the range from about 0.5 to 1.0% by weight. The briquettes have a crush strength greater than about 350 pounds when the binder is present in the range from about 1.5 to 5.0% by weight. The briquettes have a survival drop height which ranges from at least about 3 to 6 feet.

Where Gilsonite® and solid coal tar pitch are used as the preferred binder materials, the briquettes so produced can be used as a fluxing agent in a steel production operation. For example, the briquettes can be used to facilitate the operation of an electric arc furnace used in a steel making operation, where the furnace receives a solid stock charge including at least selected ones of raw scrap, limestone, burnt lime, iron ore and ferro-alloy additives. The briquettes are formed, as previously described, by mixing together a mixture of quicklime or dolomitic quicklime fines and binder and applying an external force to the mixture sufficient to mechanically form the mixture into briquettes having requisite strength and durability characteristics. A quantity of the briquettes so formed are added to the furnace as required to supplement the solid charge materials.

Additional objects, features and advantages will be apparent in the written description which follows.

DETAILED DESCRIPTION OF THE INVENTION

Figure 1:
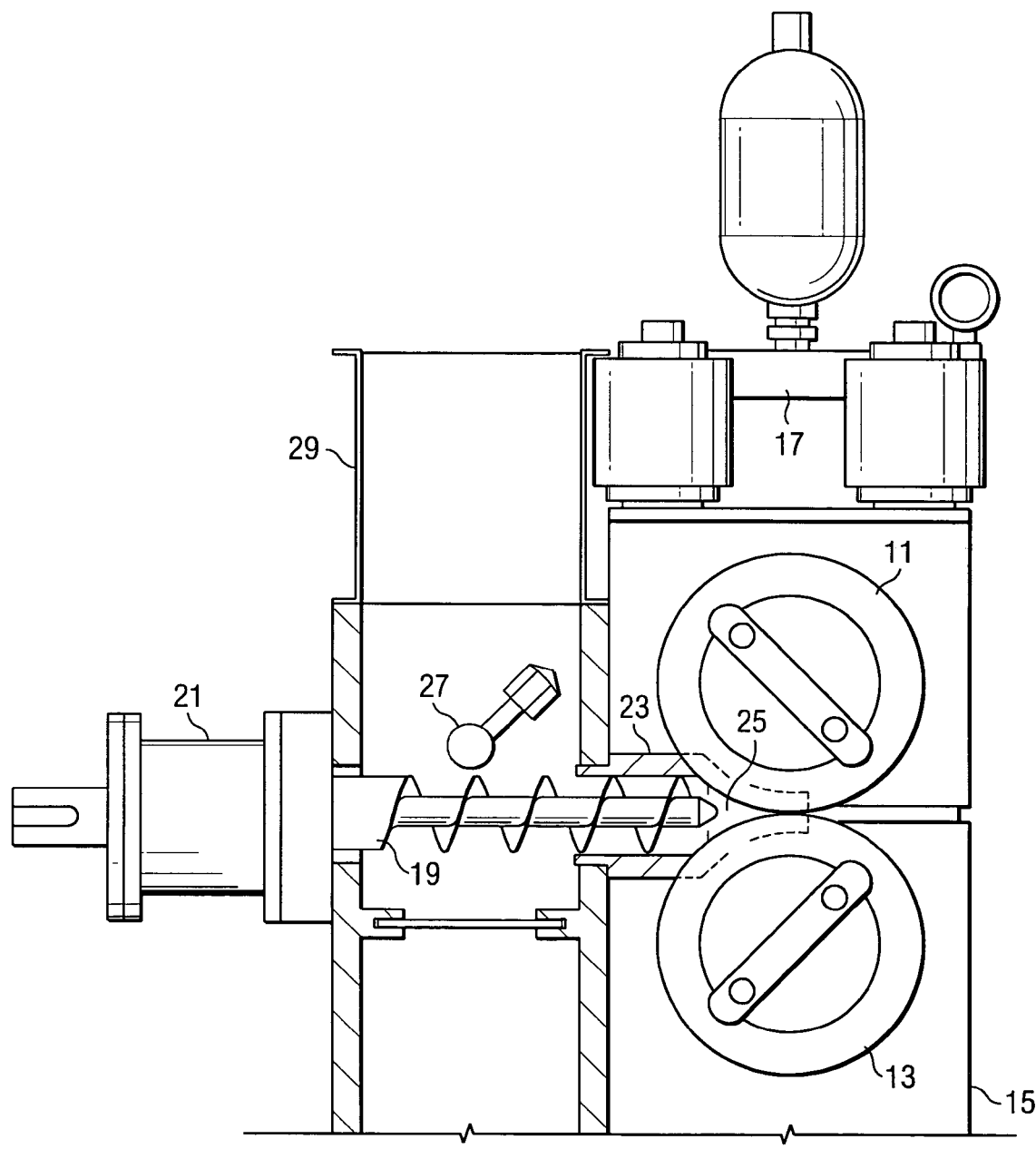
FIG. 1 is a simplified, partly schematic view of a roll press used in making the briquettes which were used in the testing of the invention.

While the invention may be utilized in a variety of industrial settings, the preferred embodiment thereof will be described with respect to briquettes which are utilized in the steel industry, for example, in an Electric Arc Furnace process. In the production of certain grades of steel in this country, an Electric Arc Furnace (EAF) is used. The EAF process will be familiar to those skilled in the art. In a typical operation, solid charge ingredients including raw scrap, limestone, burnt lime, iron ore and ferro alloy additives are charged to a furnace. Furnaces in common use include the so-called "top charge" units. Such furnaces are equipped with a roof swing which permits the roof to swing aside when cold scrap is charged; a rocker/rail tilting arrangement which allows the furnace to tilt forward for tapping and backward for slagging; means for supplying additions through the furnace roof; and evacuation means for removing dust generated during the steel making procedure.

Electrodes are typically supported overhead and project downwardly through the furnace roof. The electrodes produce an electric arc which surges between the electrodes and scrap and produces heat which melts the charge and refines the steel. The molten steel is tapped at about 3,000° F. into a ladle and is cast into blooms, poured into ingot molds, or hot rolled into sheet products.

During the electric arc furnace (EAF), process to make steel, powdered carbon is often added to improve the fluxing process and also to supply chemical energy to the furnace. Thus a briquette of dolomitic quicklime containing some source of carbon would have economic advantages to the steel maker. The use of a carbon containing binder additive for quicklime briquettes would not be detrimental to the end application and in fact, would actually be advantageous.

As discussed in the Background of the Invention, Applicant's have available a convenient source of quicklime in the form of quicklime and particularly, dolomitic quicklime fines available as excess fines from a lime calcining operation. At times, such fines (less than about ¼ inch in diameter) are produced in quantities which exceed the market demand. The briquetting of such fines, together with a carbon constituent in the binder, would provide a valuable supplement for the solid charge stock in steel manufacturing operations. As typical examples of the type of quicklime fines utilized, a first source of dolomitic quicklime, CaO·MgO, had a moisture content <0.4% and a bulk density of 1.21 g/cm³. The average particle size measurements for the first sample were as follows:

TABLE I

| MATERIAL RETAINED ON SIEVE | | | MASS | MASS |
|---|---|---|---|---|
| MESH | MICRONS | MASS [g] | FRACTION [%] | ACCUMUL. [%] |
| 6 | 3360 | 302.3 | 65.7 | 65.7 |
| 10 | 2000 | 105.6 | 22.9 | 88.6 |
| 18 | 1000 | 9.9 | 2.2 | 90.7 |
| 35 | 500 | 5.9 | 1.3 | 92.0 |
| 70 | 210 | 25.8 | 5.6 | 97.6 |
| 140 | 105 | 8.3 | 1.8 | 99.4 |
| 200 | 74 | 1.8 | 0.4 | 99.8 |
| PAN | #N/A | 0.8 | 0.2 | 100.0 |

Another source of quicklime fines was a Montevallo CaO·MgO having a moisture content <0.4% and a bulk density of 0.89 g/cm³. The average particle size measurements for the second sample were as follows:

TABLE II

| MATERIAL RETAINED ON SIEVE | | | MASS | MASS |
|---|---|---|---|---|
| MESH | MICRONS | MASS [g] | FRACTION [%] | ACCUMUL. [%] |
| 6 | 3360 | 47.3 | 13.3 | 13.3 |
| 10 | 2000 | 32.1 | 9.0 | 22.4 |
| 18 | 1000 | 43.9 | 12.4 | 34.8 |
| 35 | 500 | 35.5 | 10.0 | 44.8 |
| 70 | 210 | 80.6 | 22.7 | 67.5 |
| 140 | 105 | 80.9 | 22.8 | 90.3 |
| 200 | 74 | 24.1 | 6.8 | 97.1 |
| PAN | #N/A | 10.3 | 2.9 | 100.0 |

Despite the availability of a convenient source of quicklime fines, no readily available technology was known to produce a briquette having the requisite crush strength and durability. The addition of known types of binding additives, such as calcium stearate and paper fibers has not been accepted in the industry. Also, these type additives, while perhaps not detracting from the overall steel making process, would not actually contribute in any significant way to the operation of the steel furnace.

Applicant's earliest attempts to produce an acceptable quicklime briquette with adequate strength involved the use of two of the most common and least expensive forms of carbon, i.e. coal and petroleum coke. However, the use of these commonly available sources of carbon resulted in briquettes of lower strength which were not acceptable for purposes of the present invention. The typical addition rates of these sources of carbon were in the range from about 5.0 to 50.0% by weight, based upon the total weight of material used to make the briquettes. The carbon particles from these sources were observed to be brittle in nature and, as a result, would not act as a suitable binder for the dolomitic quicklime fines. It was theorized that a source of carbon that was not brittle but which had pseudo-plastic properties and that would deform under the elevated temperature and pressure of the briquetting process would act as a suitable binder. By selecting a suitable carbon source having a thermoplastic nature, as the briquettes cooled, the carbon constituent would return to a solid phase and bind the dolomitic quicklime fines. The result would be an increase in strength and durability in the briquettes ultimately produced.

Applicant has identified two classes of commercially available materials which are suitable and preferred for the purposes of the present invention. While not meaning to be limited to these specific classes of materials, they are representative of classes of carbon-based additives that exhibit the required characteristics for practicing the invention. The particularly preferred classes of materials include (1) Gilsonite®; and (2) solid coal tar pitch. Additive rates of 0.5 to 5% by weight, based upon the total weight of material used to make the briquette, showed a significant increase in strength and durability in the briquettes ultimately produced. A third class of materials includes recycled plastics such as recycled polyethylene, recycled polypropylene and similar thermoplastic materials.

Gilsonite® is a trade name for a natural asphalt product mined by the American Gilsonite Corporation. The following grades of product were found to be acceptable for purposes of practicing the invention:

TABLE III

Gilsonite ® Foundry Grade I:
Typical Properties

| | |
|---|---|
| Softening Point (ASTM E28-92) | 160–182° C. |
| | 320–360° F. |
| Ash (ASTM D271-70 M) | 0.5% |
| | 2.0% Maximum |
| Moisture (AGC Method) | 0.5% |
| | 2.0% Maximum |
| Penetration (25° C., 100 gm, 5 sec.) | 0 |
| Color in Mass | Black |
| Flash Point (COC) | 316° C.; 600° F. |
| Sulfur | 0.3% |
| Specific Gravity | 1.05 |
| Fixed Carbon | 18% |
| BTU per pound | 18,000 |
| Volatile Combustible Matter at 1900° F., ASTM D271-4 | 81% |
| Lustrous Carbon Content | 35–38% |
| Coking Value | 25–30% |

TABLE IV

Gilsonite ® Foundry Grade II
Properties

| | |
|---|---|
| Softening Point (ASTM E28-92) | 165–182° C. |
| | 320–360° F. |
| Ash (ASTM D271-70 M) | 6.0% Typical |
| | 10.0% Maximum |
| Moisture (AGC Method) | 3.0% Typical |
| | 5% Maximum |
| Penetration (25° C., 100 gm, 5 sec.) | 0 |
| Flash Point (COC) | 316° C.; 600° F. |
| Sulfur | 0.3% |
| Specific Gravity | 1.05 |

TABLE V

Gilsonite ® Selects 300 Grade:
Typical Properties

| | |
|---|---|
| Viscosity (25° C., 30% solids, Magie 470) | 500–1,400 cPs |
| Softening Point (ASTM E28-92) | 141–154° C. |
| | 285–310° F. |
| Ash (ASTM D271-70 M) | 0.50% Typical |
| | 0.90% Maximum Guaranteed |
| Moisture (AGC Method) | 0.2%–0.5% Typical |
| | 0.7% Maximum Guaranteed |
| Penetration (25° C., 100 gm, 5 sec.) | 0 |
| Flash Point (COC) | 316° C.; 600° F. |
| Sulfur | 0.3% |
| Specific Gravity | 1.04 |
| Acid No. | <3 |
| Color in Mass | Black |

The second class of binder materials found to be acceptable for purposes of practicing the invention were solid-coat tar pitches. The first coal chemical recovery ovens were installed in the United States in the 1890's. By the turn of the $20^{th}$ century, by-product ovens accounted for some 97 percent of the metallurgical coke produced in the United States. Since that time, coal tar pitch has been used as a binder in the aluminum, commercial carbon and graphite industries. However, beginning in the 1980's, many of the coke ovens in the United States began to close, due primarily to economic and environmental pressures. The closing of traditional coke ovens has left coal tar pitch suppliers and users seeking additional sources for solid coal tar. One such source, which has been found to be acceptable for purposes of the present invention is petroleum enhanced coal tar pitch. Commercially available product can be obtained from Koppers Industries in the form of a hybrid binder pitch which contains both coal tar and petroleum components. The following table compares the properties of traditional coal tar pitch, two petroleum enhanced pitches and pure petroleum:

TABLE VI

| Property | Coal Tar Pitch | 15% Petro | 20% Petro | Petroleum |
|---|---|---|---|---|
| Softening Point ° C. | 109.4 | 108.5 | 107.7 | 108.7 |
| Toluene Insolubles, wt. % | 27.5 | 25.8 | 24.8 | 3.5 |
| Quinoline Insolubles, wt. % | 13.1 | 12.6 | 12.6 | 0 |
| Beta Resins, wt. % | 14.4 | 13.2 | 12.2 | 3.5 |
| Coking Value, wt. % | 57.8 | 56.3 | 55.4 | 47.1 |
| Ash, wt. % | 0.07 | 0.14 | 0.13 | 0.03 |
| Specific Gravity | 1.336 | 1.32 | 1.318 | 1.225 |
| Sulfur | 0.64 | 0.68 | 0.71 | 1.46 |

A number of tests were conducted using the dolomitic quicklime samples and the binder materials in order to evaluate the influence of the various carbon based additives on the briquetting process and on ultimate briquette strength and durability.

To form briquettes, the dolomitic quicklime fines and binder material are combined to form a homogenous mixture. The mixture of ingredients is then compacted, using conventional techniques, to form a briquette. Briquette forming devices include roller presses, disk pelletizers, turbulators, and conventional presses and pans. It is necessary that the briquetting device be able to exert sufficient pressure on the mixture so as to cause the binder to flow with increased temperature. Upon removal of the briquetting force, the burden reverts to the solid phase, thereby forming a solid, compacted briquette.

FIG. 1 is a partly schematic view of the K.R. Komarek model B-220QC roller press which was used in the testing. As shown in FIG. 1, the rolls 11 are carried on shafts 13 in bearing blocks 15. A supporting hydraulic system 17 is mounted above the bearing block. Material from the feed hopper 29 is supplied to the roll nip with a horizontal screw 19 mounted on a screw feeder bearing block 21. The screw 19 is driven by a variable speed drive unit (not shown). A paddle mixer 27 is used to agitate the material as it is fed to the horizontal screw 19 at the feed inlet. The material is then compacted between the two rolls 11 which are cantilevered on the ends of the shafts 13. The hydraulic system 17 provides an adjustable force for holding the rolls together.

This force is equal in magnitude to the roll separating force generated by the compacted material in the roll nip. The forces encountered in forming the briquettes in the roller press were sufficient to deform the pseudo-plastic carbon containing additive and make it flow. The binder additive returned to the solid phase upon cooling, resulting in a compacted briquette having the requisite strength and durability characteristics.

Figure 2:
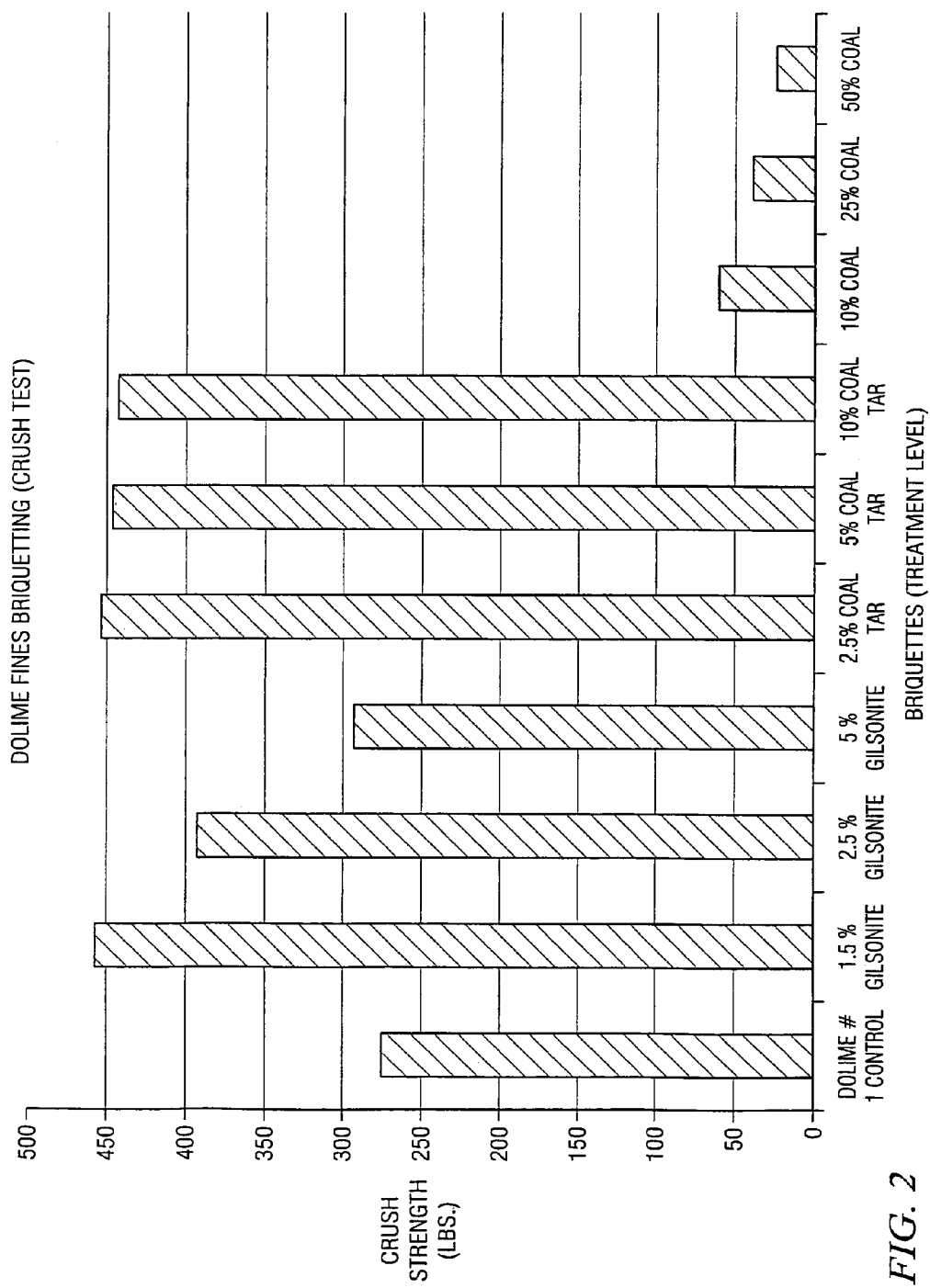
FIG. 2 is a graphical representation of a first set of test results showing the improved crush strengths achieved through the use of the binder material of the invention.
Figure 3:
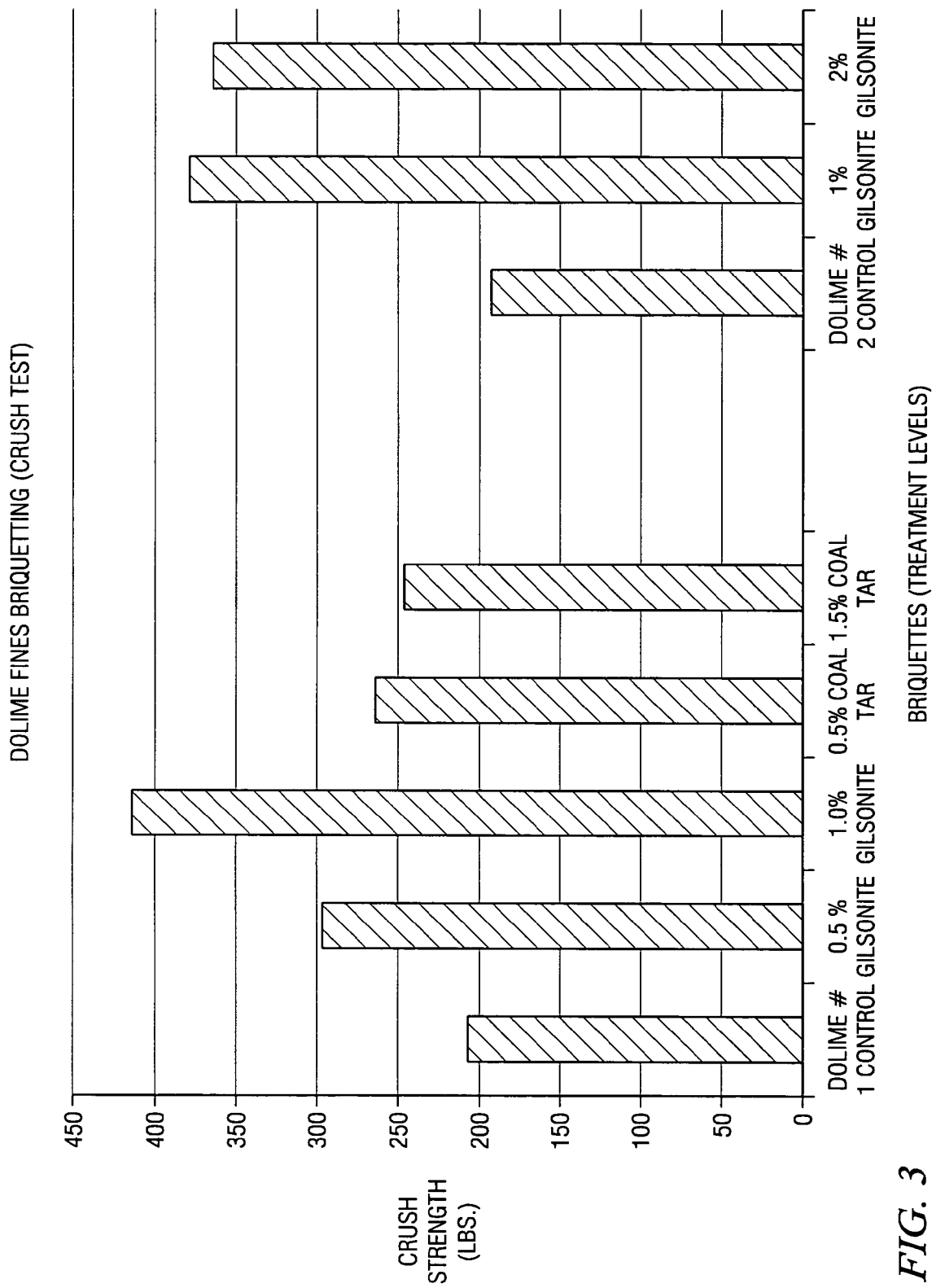
FIG. 3 is a graphical representation, similar to FIG. 2, showing another set of test results.

The feed material for each run was formulated and the briquetting process was tested using the above described test apparatus. Once the roller was operating under stable conditions, the data was collected. Two methods were used to test the strength and durability of the ultimately produced briquettes, as shown in FIGS. 2 and 3, attached.

A. Crush Strength:

Each briquette was placed between two parallel plates and loaded until failure. Briquette strength is expressed as the maximum force the briquette resists before failing.

B. Drop Strength:

The briquettes were dropped onto a concrete floor from various predetermined heights. Drop strength was defined as a height of drop at which more than 50% of the briquettes started to break because of the impact force.

Conclusions:

From the tests conducted, it will be appreciated that the binder additives of the invention were beneficial, increasing the briquette mechanical strength. Even a relatively small percentage of binder (0.5%) caused a notable increase in the briquette crushing force and drop strength. Particularly notable increases in briquette crushing force and drop strength were observed with 2.5% addition of coal tar pitch and with 2.5% and 1.5% addition of Gilsonite®.

In addition to providing superior binding properties, the binder material of the invention also enhanced the overall properties of the quicklime briquettes as fluxing agents for steel manufacturing operations, due to the fact that the overall carbon content of the briquettes was increased.

An invention has been provided with several advantages. The method of the invention provides for the use of a special class of carbon-based additives for lime-based products where the products will be used for specific end use applications, where the presence of the additive does not negatively affect the performance of the briquettes in the selected market. While similar additives have been used as binders in other industries, their use in briquetting lime fines solves an existing industry problem in providing a market for such fines. Additionally, a demonstrable value is added, particularly in the case of the steel industry, due to the carbon content of the binder material.

While the invention has been shown in only two of its forms, it is not thus limited but is susceptible to various changes and modifications without departing from the spirit thereof.

We claim:

1. A method of briquetting quicklime fines, comprising the steps of:
   providing a source of quicklime or dolomitic quicklime fines;
   adding a binder to the source of quicklime fines, the binder comprising a pseudo-plastic carbon containing material which will deform under briquetting conditions of elevated temperature and pressure and flow and which will also return to a solid phase and bind the quicklime fines upon cooling;
   applying an external pelletizing force to the mixture of fines and binder sufficient to compact and form the mixture into a briquette having requisite strength and durability characteristics and
   wherein the binder is present in an amount ranging from about 0.5 to 5% by weight, based upon the total weight of the mixture.

2. The method of claim 1, wherein the binder is selected from the group consisting of natural asphalt and solid coal tar pitch.

3. The method of claim 2, wherein the briquettes so produced are characterized as having a crush strength which is greater than about 250 pounds when the binder is present in the range from about 0.5 to 1.0% by weight.

4. The method of claim 2, wherein the briquettes so produced are characterized as having a crush strength greater than about 350 pounds when the binder is present in the range from about 1.5 to 5.0% by weight.

5. The method of claim 2, wherein the solid coal tar pitch is a petroleum enhanced coal tar pitch.

6. The method of claim 2, wherein the briquettes so produced have a survival drop height from about 3 to 6 feet.

* * * * *